Dec. 10, 1963 W. E. MOULIC, JR 3,113,708

MAGNETIC TAPE DRIVE MECHANISM AND CONTROL THEREFOR

Filed Aug. 9, 1961 3 Sheets-Sheet 1

INVENTOR

William E. Moulic, Jr.

BY Mason, Fenwick & Lawrence

ATTORNEYS

Dec. 10, 1963 W. E. MOULIC, JR 3,113,708

MAGNETIC TAPE DRIVE MECHANISM AND CONTROL THEREFOR

Filed Aug. 9, 1961 3 Sheets-Sheet 2

INVENTOR
William E. Moulic, Jr.

BY
Mason, Fenwick & Lawrence
ATTORNEYS

MAGNETIC TAPE DRIVE MECHANISM AND CONTROL THEREFOR

Filed Aug. 9, 1961 3 Sheets-Sheet 3

INVENTOR
William E. Moulic, Jr.

BY Mason, Fenwick & Lawrence
ATTORNEYS

3,113,708
MAGNETIC TAPE DRIVE MECHANISM AND CONTROL THEREFOR

William E. Moulic, Jr., Rte. 2, Bloomington, Ill.
Filed Aug. 9, 1961, Ser. No. 130,351
4 Claims. (Cl. 226—181)

The present invention relates in general to magnetic recording-reproducing apparatus, and more particularly to a magnetic tape transport and actuator mechanism for recording-reproducing apparatus of the type employing endless tape and the like.

An object of the present invention is the provision of a magnetic tape transport mechanism and control therefor for magnetic recording-reproducing apparatus and the like, which is responsive to control signals in a novel manner to effect quick and reliable regulation of movement of magnetic tape relative to the transducer head or heads of the apparatus.

Another object of the present invention is the provision of a novel magnetic tape transport mechanism and actuating means therefor for magnetic tape recording-reproducing apparatus of the type embodying endless magnetic tape cartridges which is readily adaptable to remote control of magnetic tape driving means to selectively adjust the same to operative and inoperative positions.

Another object of the present invention is the provision of a novel magnetic tape transport mechanism and actuating means for magnetic recording-reproducing apparatus of the endless tape cartridge type wherein a pressure roller is adjustable to a plurality of positions along an arcuate path responsive to a solenoid to selectively press a magnetic tape into engagement with a motor-driven capstan to effect driving of the tape and to release the tape from driven engagement with the capstan.

Other objects, advantages and capabilities of the present invention will become apparent from the following detailed description, taken in conjunction with the accompanying drawings illustrating one preferred embodiment of the invention.

Figure 1:
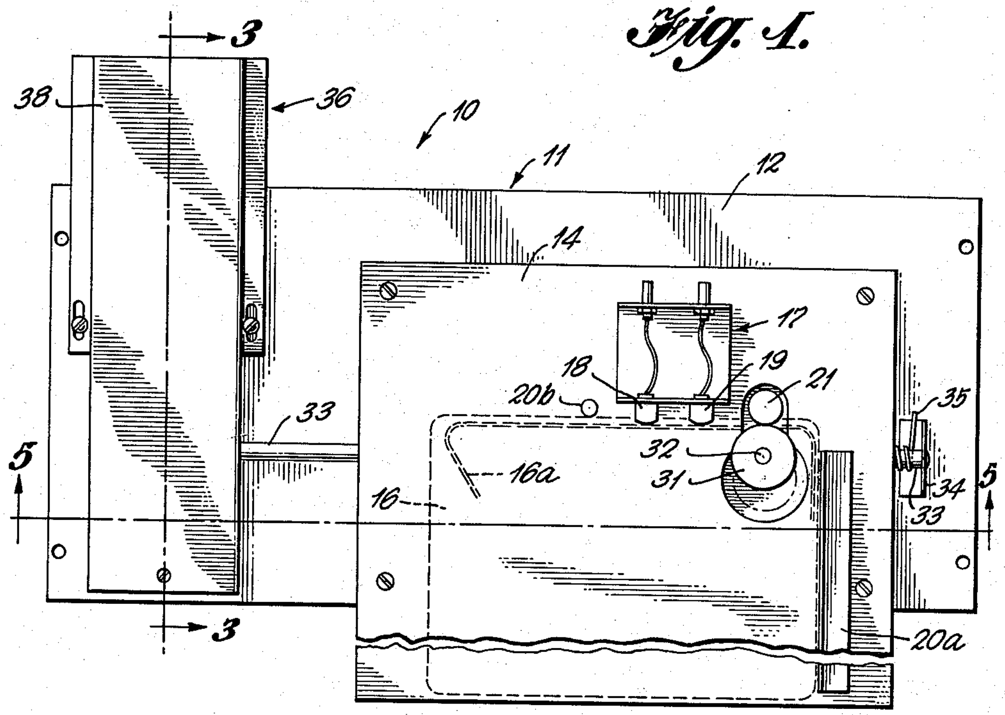
FIGURE 1 is a top plan view of a magnetic recording-reproducing deck unit embodying the present invention.
Figure 5:
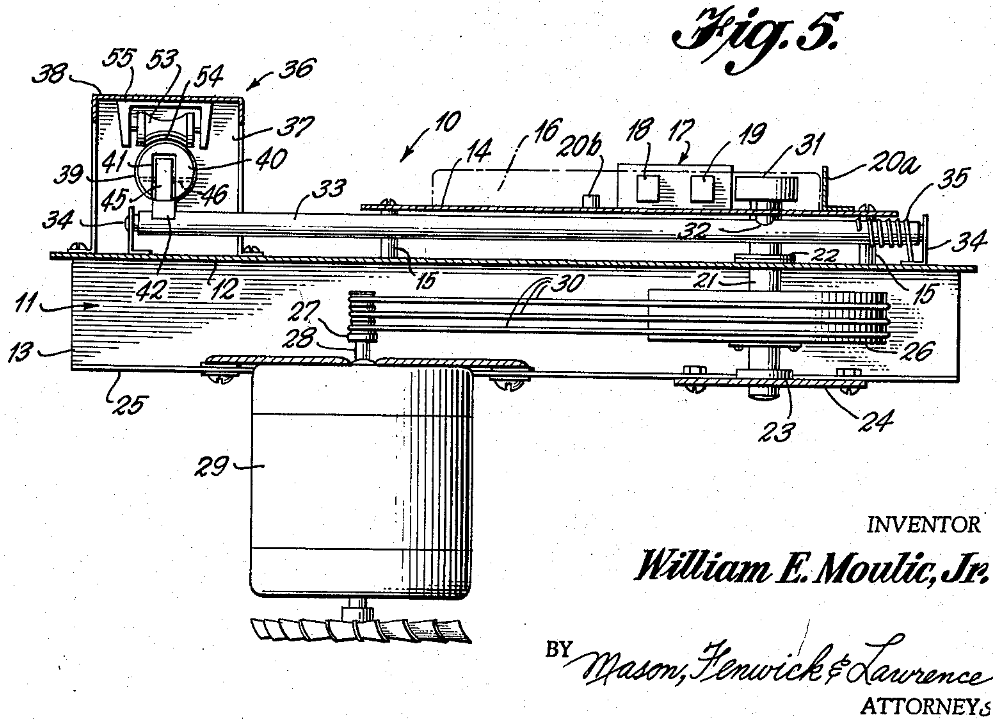
FIGURE 5 is a vertical longitudinal section view taken along the line 5—5 of FIGURE 1.
Figure 2:
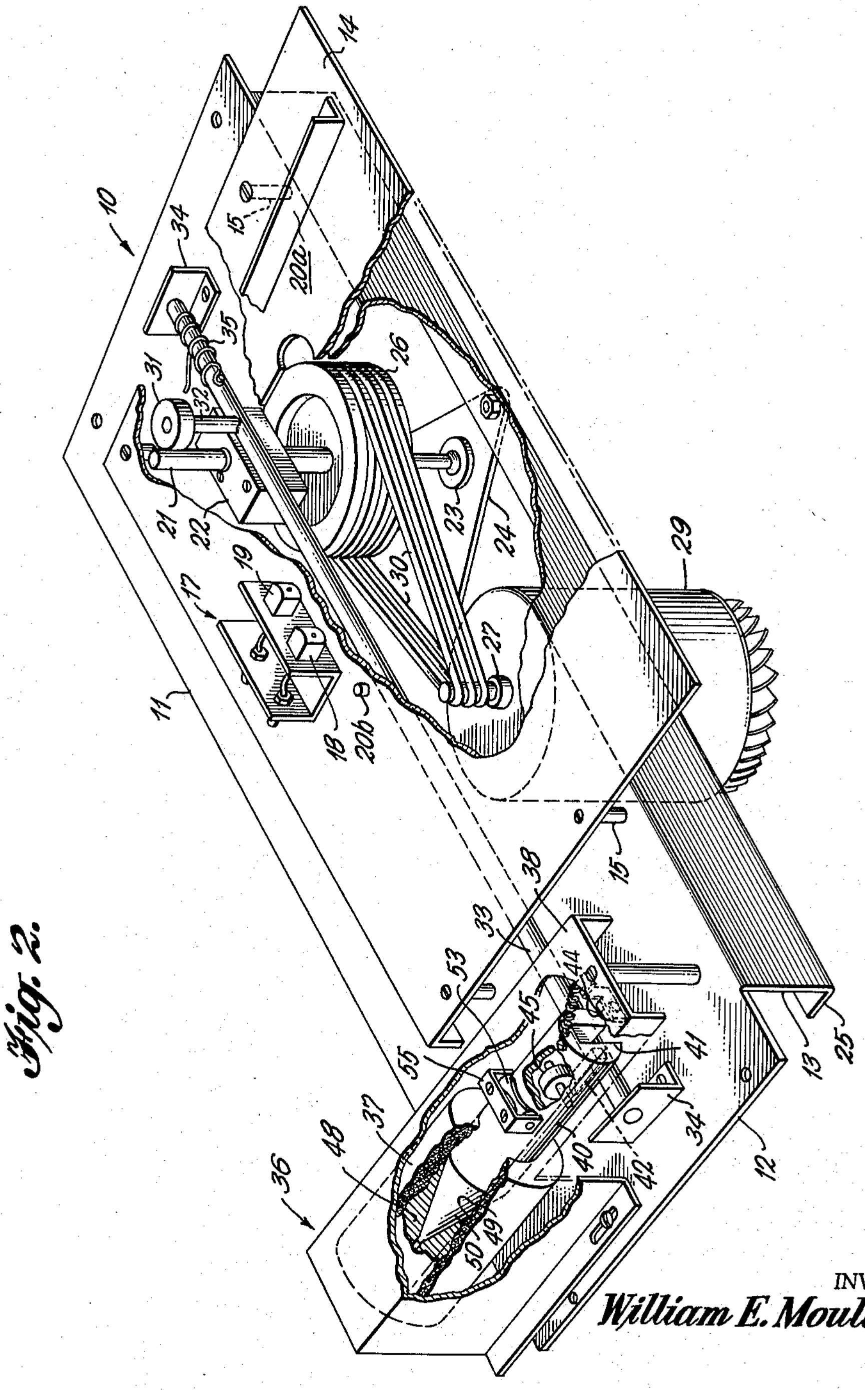
FIGURE 2 is a perspective view thereof with parts broken away and parts illustrated in section to reveal details of construction thereof.

Referring to the drawings, wherein like reference characters designate corresponding parts throughout the several figures, a preferred embodiment of the present invention constructed in the form of a magnetic tape recording-reproducing deck unit of a type designed to employ endless magnetic tape cartridges is indicated generally by the reference character 10. The deck unit 10 includes a chassis 11 having a top plate 12 bounded at the front and rear by depending sides 13 and a cartridge table 14 supported above the top plate 12 by spacers or posts 15, which support the operating components of the recording-reproducing deck unit. The magnetic tape cartridge, shown in FIGURE 1 by broken lines and designated by the reference character 16, is of conventional construction having openings for admitting a transducer head or heads and a pressure roller coacting with a drive capstan into operative relation with the endless magnetic tape 16*a* within the cartridge. A magnetic head assembly 17 of conventional construction, which may for example include the usual write head 18 and read head 19 is supported on the cartridge table 14 to be inserted in accommodating openings in the cartridge adjacent the path of movement of the magnetic tape 16*a*. The cartridge table 14 may be provided with a suitable angle strip 20*a* and stop 20*b* to aid in properly locating the cartridge 16 on the table 14.

A capstan shaft 21 is journaled for rotation about a vertical axis in an upper bearing assembly 22 supported on the top plate 12 and a lower bearing assembly 23 carried by a lower bearing support 24 fixed to the flanges 25 at the lower ends of the chassis side 13. The capstan shaft 21 extends through an accommodating aperture in the cartridge table 14 and the portion of the capstan shaft 21 projecting above the cartridge table 14 is designed to engage the magnetic tape 16*a* through a suitable opening in the edge of the cartridge 16 and advance the tape 16*a* through a tape feed path adjacent the magnetic heads 18, 19. The capstan shaft 21 is driven in the usual manner, the capstan unit having the usual fly wheel 26 keyed or locked to the capstan shaft 21 below the top plate 12 of the chassis 11, which is driven from a pulley 27 on the shaft 28 of motor 29 by drive belts 30 trained about the pulley 27 and fly wheel 26.

While the capstan shaft 21 is continuously rotating during operation of the recording-reproducing unit, selective regulation of the driving of the magnetic tape 16*a* past the write and read heads 18, 19 is accomplished by means of a tiltable pressure roller 31 which may be inserted through a suitable opening in the cartridge 16 to a position inwardly of the magnetic tape portion extending alongside the capstan shaft 21. The pressure roller 31 is selectively adjustable through an arcuate path between an operative and inoperative position wherein the roller 31 either presses the magnetic tape 16*a* lying between the pressure roller 31 and capstan shaft 21 against the latter with sufficient pressure to properly advance the magnetic tape relative to the heads 18, 19 or is tilted away from the capstan shaft 21 to a position below the cartridge table 14. To provide such a substantial range of arcuate tilting movement, the pressure roller 31 is journaled adjacent the end of a stub shaft 32 which is fixed to and extends radially from a main shaft 33 journaled at its opposite ends for rotation about its axis in bearing brackets 34 mounted on the top plate 12 of the chassis. The main shaft 33 extends longitudinally of the chassis 11 along an axis spaced radially of the capstan shaft 21 a distance approximately equal to the radius of the pressure roller 31, and is resiliently biased by a torsion return spring 35 in a clockwise direction as viewed in FIGURE 3 to tilt the pressure roller 31 and stub shaft 32 through an arcuate path away from the capstan shaft 21 to the position illustrated in FIGURE 4.

Figure 3:
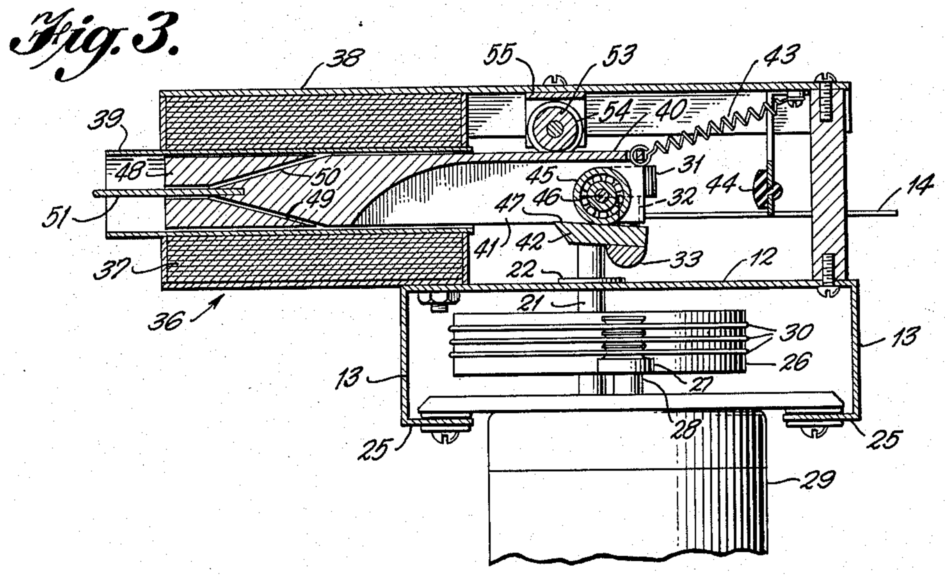
FIGURE 3 is a vertical transverse section view taken along the line 3—3 of FIGURE 1.

The main shaft 33 and radial pressure roller shaft 32 carried thereby are shifted arcuately about the axis of the main shaft 33 to tape driving position and to inoperative position wherein the roller 31 is withdrawn below the table 14 by a solenoid assembly 36 which is responsive to electrical control signals from either a control point adjacent to the recording-reproducing apparatus or from a remote control point. The solenoid assembly 36 includes an annular solenoid coil 37 supported in a suitable housing 38 and having an elongated annular non-magnetic guide tube 39 therein disposed along an axis lying perpendicular to the axis of the main shaft 33. A solenoid plunger 40 is supported for rectilinear axial movement within the guide tube 39 in the bore of the solenoid coil 37 and has a downwardly opening kerf or recess 41 over most of the portion of the plunger which projects from the guide tube 39 to accommodate arcuate movement of a follower lever 42 fixed to the main shaft 33 in generally radial relation to the main shaft and in alignment with the axis of movement of the solenoid plunger 40. The solenoid plunger 40 is resiliently biased to a projected position as illustrated in FIGURE 3 by a return spring 43 interconnected between the plunger 40 and the housing frame 38, and the housing 38 is provided with a depending stationary return bumper 44 positioned in the path of movement of the solenoid plunger 40 and forming a limit stop establishing the outermost projected position of the plunger 40. A lever follower control roller 45, such, for example, as a cylindrical ball bearing roller, is supported within the recess 41 of the plunger 40 on an axle 46 extending transversely of the plunger 40 and disposing the roller 45 at a position to continuously engage a wear surface 47 of the follower lever 42 throughout the stroke of the solenoid plunger 40. The roller 45 is positioned so as to rotate the main shaft 33 and pressure roller shaft 32 arcuately in a counterclockwise direction toward the capstan shaft 21 to shift the pressure roller 31 upwardly through the opening provided therefor in the cartridge 16 and to a position pressing the magnetic tape 16*a* against the capstan shaft 21 to be driven by the latter upon withdrawal of the solenoid plunger 40 inwardly of the guide tube 39 in response to energization of the solenoid coil 37.

To accurately confine the movement of the solenoid plunger 40 to a preselected rectilinear axis, a stationary heel piece 48 is provided adjacent the rearmost end of the solenoid coil within the guide tube 39, the heel piece 48 having a conical recess 49 opening forwardly therein to receive a complementally shaped adjacent end 50 of the solenoid plunger 40 when the plunger is in retracted position. A non-magnetic plunger guide pin 51 projects rearwardly from the adjacent end of the plunger 40 into a counterbored opening 52 in the center of the heel piece 48 in which the plunger guide pin 51 rides at all positions of the solenoid plunger 40. Also, a thrust roller 53 having a concave periphery 54 conforming to the cross sectional curvature of the plunger 40 and rotatable about an axis extending transversely of the axis of the plunger 40 is carried by a depending bracket 55 mounted on the housing 38 to bear against the upwardly facing portion of the solenoid plunger 40 and resist tilting of the plunger out of alignment with its preselected axis of movement.

Figure 4:
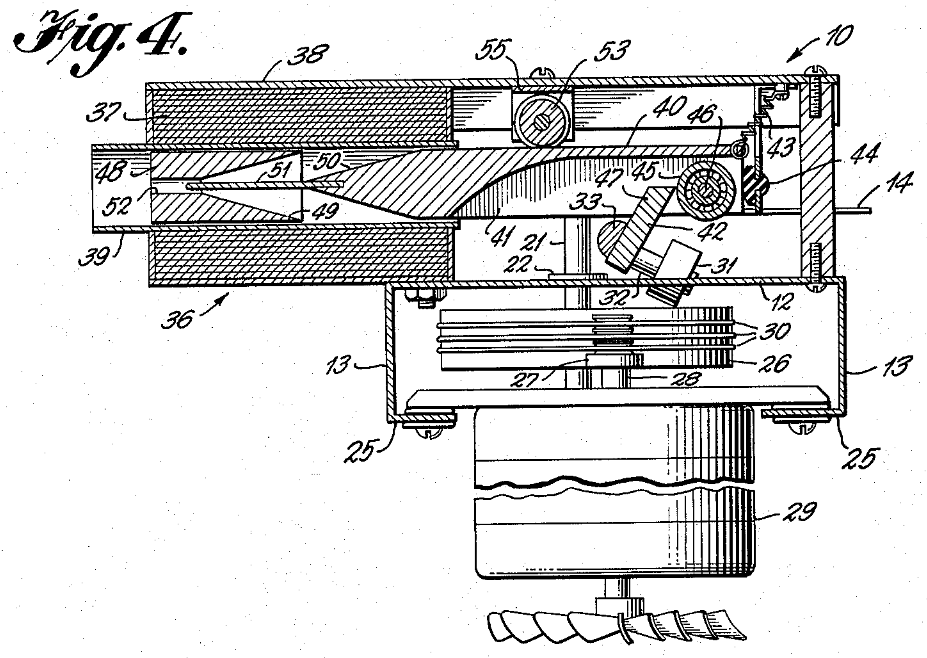
FIGURE 4 is a section view similar to FIGURE 3 showing the tape driving means in inoperative position.

In the operation of the apparatus, the solenoid coil 37 will normally be in a deenergized state, permitting the solenoid plunger 40 under the influence of the return spring 43 to occupy the projected position illustrated in FIGURE 4 wherein the lever follower control roller 45 is located at a position allowing the main shaft 33 to be rotated under the influence of the torsion return spring 35 through an arcuate range disposing the pressure roller 31 at its inoperative position below the cartridge table 14. Upon energization of the solenoid coil 37, the plunger 40 will be retracted inwardly of the guide tube 39, shifting the follower control roller 45 and the follower lever 42 engaging the latter through paths causing the main shaft 33 and pressure roller 31 to be shifted arcuately toward the capstan shaft 21 to a position wherein the pressure roller 31 enters the cartridge 16 and forces the magnetic tape 16*a* against the capstan shaft 21 with sufficient pressure to properly advance the magnetic tape from the cartridge along the magnetic heads 18, 19. Upon deenergization of the solenoid coil 37 the return spring 43 withdraws the solenoid plunger 40 to the projected position illustrated in FIGURE 4, whereby the torsion spring 35 again rotates the main shaft 33 through an arc to shift the pressure roller 31 to its inoperative position spaced from the capstan shaft 21 and below the table 14.

In practice, it has been found that desirable results are achieved if the follower lever 42 is fixed to the main shaft 32 at a radial position located about 78° to 82° from the axis of the pressure roller stub shaft 32, and the parts are sized so that the main shaft 33 and plunger stub shaft 32 are rotated through an arc of about 103° with a plunger travel of approximately one inch.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. An automatic tape drive mechanism for a magnetic recording-reproducing apparatus for endless magnetic tape cartridges and the like, comprising a cartridge supporting panel against which the cartridge is to be moved along an axis paralleling the panel to a selected cartridge station, a driving capstan projected above said panel rotatable about an axis perpendicular to said panel for advancing magnetic tape pressed thereagainst along a selected path, a rotatable main shaft journaled for rotation about an axis perpendicular to the capstan axis having a stub shaft projecting radially therefrom supporting a pressure roller spaced from said main shaft, solenoid means for imparting angular movement to said main shaft to fully rotate said roller and stub shaft through an arc between selected angularly spaced positions disposing said pressure roller at a retracted inoperative position spaced from said capstan and below said panel and an extended operative position wherein the pressure roller presses the tape against the capstan, said panel having an opening accommodating movement therethrough of said pressure roller between said operative and inoperative positions, return spring means connected to said main shaft continuously urging said main shaft to return said pressure roller to said inoperative position below said panel, said solenoid means including a rectilinearly reciprocative plunger movable along an axis perpendicular to and spaced from the axis of said main shaft having follower actuator means carried on said plunger, guide means for restricting movement of said plunger to a rectilinear axis, follower means fixed to said shaft and projecting transversely thereof into contact with said follower actuator means responsive to axial movement of the plunger to shift said shaft to selected angular positions in accordance with movement of said plunger to dispose said pressure roller at said inoperative and operative positions, and electrical signaling means coupled to said solenoid means to adjust the solenoid plunger to selected axially spaced plunger positions.

2. An automatic tape drive mechanism for a magnetic recording-reproducing apparatus for endless magnetic tape cartridges and the like, comprising a cartridge supporting panel against which the cartridge is to be moved along an axis paralleling the panel to a selected cartridge station, a driving capstan projected above said panel rotatable about an axis perpendicular to said panel for advancing magnetic tape pressed thereagainst along a selected path, a rotatable main shaft journaled for rotation about an axis perpendicular to the capstan axis having a stub shaft projecting radially therefrom supporting a pressure roller spaced from said main shaft, solenoid means for imparting angular movement to said main shaft to fully rotate said roller and stub shaft through an arc between selected angularly spaced positions disposing said pressure roller at a retracted inoperative position spaced from said capstan and below said panel and an extended operative position wherein the pressure roller presses the tape against the capstan, said panel having an opening accommodating movement therethrough of said pressure roller between said operative and inoperative positions, return spring means connected to said main shaft continuously urging said main shaft to return said pressure roller to said inoperative position below said panel, said solenoid means including a rectilinearly reciprocative plunger movable along an axis perpendicular to and spaced from the axis of said main shaft having a roller carried thereby, a follower arm fixed to said main shaft and extending generally radially thereof into contact with said roller of said solenoid plunger, said follower arm being responsive to axial movement of said solenoid plunger to position said main shaft at said selected angularly spaced positions disposing said pressure roller at said operative and inoperative positions in accordance with axial adjustment of said solenoid plunger, and means for controlling electrical energization of said solenoid means for selectively moving the solenoid plunger to axial positions corresponding to said operative and inoperative pressure roller positions.

3. An automatic tape drive mechanism for a magnetic recording-reproducing apparatus for endless magnetic tape cartridges and the like, comprising a cartridge supporting panel against which the cartridge is to be moved along an axis paralleling the panel to a selected cartridge station, a driving capstan projected above said panel rotatable about an axis perpendicular to said panel for advancing magnetic tape pressed thereagainst along a selected path, a rotatable main shaft journaled for rotation about an axis perpendicular to the capstan axis having a stub shaft projecting radially therefrom supporting a pressure roller spaced from said main shaft, solenoid means for imparting angular movement to said main shaft to fully rotate said roller and stub shaft through an arc between selected angularly spaced positions disposing said pressure roller at a retracted inoperative position spaced from said capstan and below said panel and an extended operative position wherein the pressure roller presses the tape against the capstan, said panel having an opening accommodating movement therethrough of said pressure roller between said operative and inoperative positions, return spring means connected to said main shaft continuously urging said main shaft to return said pressure roller to said inoperative position below said panel, said solenoid means including a solenoid coil having a guide tube extending therethrough and an axially reciprocative solenoid plunger movable along a rectilinear axis perpendicular to said horizontal axis of rotation and having a portion slidably supported within said guide tube, a solenoid heel piece fixedly located within said guide tube having a guide bore therein aligned with the axis of the guide tube, said solenoid plunger having an elongated guide pin extending from the end of the plunger adjacent said heel piece axially of the guide tube into said bore, said guide pin being of a length to continuously project into the bore of said heel piece throughout the axial stroke of the solenoid plunger, said heel piece and plunger having a conical recess and complementary conical end portion respectively at the confronting ends thereof to be disposed in nesting relation when the plunger is in a fully retracted position, a roller member carried by said solenoid plunger at a location externally of said guide tube, a follower arm projecting transversely of the axis of rotation of said pressure roller supporting means and intercoupled with the latter for engaging said solenoid plunger roller member and responding to movement of said plunger to tilt said pressure roller selectively to said inoperative and operative positions, and electrical signalling means coupled to said solenoid coil to control energization of the same and selectively adjust the solenoid plunger to axially spaced plunger positions corresponding to said inoperative and operative pressure roller positions.

4. An automatic tape drive mechanism for a magnetic recording-reproducing apparatus for endless magnetic tape cartridges and the like, comprising a cartridge supporting panel against which the cartridge is to be moved along an axis paralleling the panel to a selected cartridge station, a driving capstan projected above said panel rotatable about an axis perpendicular to said panel for advancing magnetic tape pressed thereagainst along a selected path, a rotatable main shaft journaled for rotation about an axis perpendicular to the capstan axis having a stub shaft projecting radially therefrom supporting a pressure roller spaced from said main shaft, solenoid means for imparting angular movement to said main shaft to fully rotate said roller and stub shaft through an arc between selected angularly spaced positions diposing said pressure roller at a retracted inoperative position spaced from said capstan and below said panel and an extended operative position wherein the pressure roller presses the tape against the capstan, said panel having an opening accommodating movement therethrough of said pressure roller between said operative and inoperative positions, a torsion spring wound about said main shaft having one end fixed to said main shaft and the other end fixed to a stationary anchor continuously biasing said main shaft in a direction and to an angular position to return said pressure roller to said inoperative position below said panel, said solenoid means including a solenoid coil having a guide tube extending therethrough and an axially reciprocative solenoid plunger movable along a rectilinear axis perpendicular to said horizontal axis of rotation and having a portion slidably supported within said guide tube, a solenoid heel piece fixedly located within said guide tube having a guide bore therein aligned with the axis of the guide tube, said solenoid plunger having an elongated guide pin extending from the end of the plunger adjacent said heel piece axially of the guide tube into said bore, said guide pin being of a length to continuously project into the bore of said heel piece throughout the axial stroke of the solenoid plunger, said heel piece and plunger having a conical recess and complementary conical end portion respectively at the confronting ends thereof to be disposed in nesting relation when the plunger is in a fully retracted position, thrust roller means supported on a fixed axis of rotation to engage a side of said solenoid plunger externally of said guide tube, said guide pin and heel piece bore and said thrust roller means coacting to restrain said solenoid member against tilting movement transversely of said rectilinear axis, a roller member carried by said solenoid plunger at a location externally of said guide tube, a follower arm projecting transversely of the axis of rotation of said pressure roller supporting means and intercoupled with the latter for engaging said solenoid plunger roller member and responding to movement of said plunger to tilt said pressure roller selectively to said inoperative and operative positions, and electrical signalling means coupled to said solenoid coil to control energization of the same and selectively adjust the solenoid plunger to axially spaced plunger positions corresponding to said inoperative and operative pressure roller positions.

References Cited in the file of this patent

UNITED STATES PATENTS

| | | |
|---|---|---|
| 1,226,697 | Rinsche | May 22, 1917 |
| 2,102,761 | Strobel | Dec. 21, 1937 |
| 2,876,005 | Eash | Mar. 3, 1959 |
| 2,976,464 | Gopfert | Mar. 21, 1961 |
| 3,023,943 | Schober | Mar. 6, 1962 |
| 3,027,112 | Flan | Mar. 27, 1962 |

FOREIGN PATENTS

| | | |
|---|---|---|
| 41,868 | France | Jan. 26, 1933 |